June 21, 1966 FRIEDRICH-WILHELM DEHMELT ETAL 3,257,570
SEMICONDUCTOR DEVICE
Filed March 6, 1961
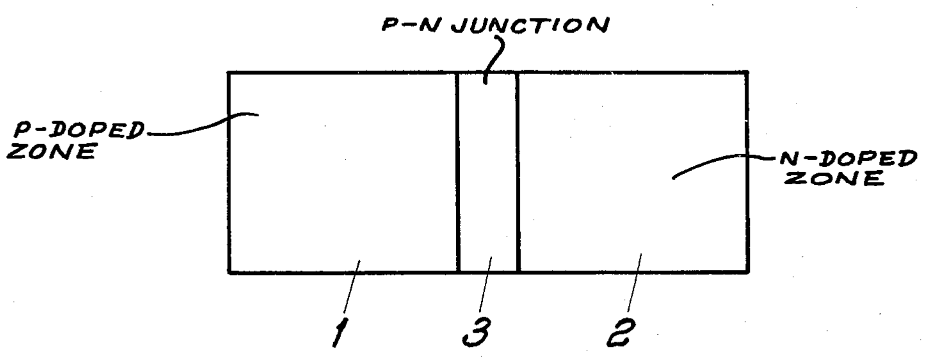
Friedrich-Wilhelm Dehmelt
Jürgen Schulz
Inventors
by: George H. Spencer
Attorney 3,257,570
Patented June 21, 1966

3,257,570

SEMICONDUCTOR DEVICE

Friedrich-Wilhelm Dehmelt, and Jürgen Schulz, both of Ulm (Danube), Germany, assignors to Telefunken Aktiengesellschaft, Berlin, Germany Filed Mar. 6, 1961, Ser. No. 93,377
Claims priority, application Germany, Mar. 9, 1960, T 18,013
8 Claims. (Cl. 310—3)

The invention relates to a semiconductor device for generating electrical energy and having at least one P–N junction including a semiconductor body treated with radioactive rays.

If, for example, beta radiation is permitted to act on a semiconductor body, the atoms in the semiconductor body are ionized, due to the energy introduced into the semiconductor body by the beta radiation. If there is a P–N junction in the semiconductor body exposed to this radiation, the charge carriers liberated by the ionization diffuse to this P–N junction and generate a voltage at it.

This radiation effect has already been utilized for producing electrical energy. In one known device, the semiconductor body having a P–N junction is bombarded with beta particles from a radiation source lying outside the semiconductor body. The drawback of this known device, however, lies in the fact that the radiation source is outside the semiconductor body so that only beta particles with a high radiation energy can penetrate into the semiconductor body. This required high-radiation energy means too short an operational life for these energy sources, due to the destructive power of the high-energy beta particles.

To eliminate these drawbacks, it is proposed according to the invention, in a semiconductor device with at least one P–N junction for generating electric energy to include radioactive substances in the semiconductor body.

It is preferable to use beta radiators as the radioactive substances, since among the beta radiators there are available those with a small enough radiation energy that they will not destroy the semiconductor structure. It is also desirable to use pure beta radiators to exclude gamma radiation.

Including the beta radiator directly in the semiconductor crystal according to the invention has the advantage that, in contrast to the case where the radiation comes from outside the semiconductor body, internal beta radiators can be used whose energy is great enough to register a useable energy transformation, without requiring that the energy be so great as to risk destruction of the semiconductor element.

Preferably, the radioactive substances are introduced directly into the barrier layer or into its immediate vicinity in the semiconductor body. When introducing the radioactive substances, care has to be taken that charge carriers forming more than the length of one diffusion path distant from the barrier layer cannot reach the barrier layer and thus are unable to contribute to the formation of the potential at the barrier layer.

A suitable radioactive substance for inclusion is, for example nickel 63 with a maximum particle energy of 67,000 ev. and a half-life period of 65 years; also, as another example, palladium 107, with a maximum particle energy of 35,000 ev. and a half-life period of $7 \times 10^6$ years, can be used.

Additional objects and advantages of the present invention will become apparent upon consideration of the following description when taken in conjunction with the accompanying drawing in which the single figure of the drawing shows a semiconductor body with two adjoining zones of different conductivity types designated 1 and 2, respectively, i.e., the zones 1 and 2 are "oppositely-doped" in the sense that one of them, for instance zone 1, is p-doped, while zone 2 is n-doped. Between these two conductor zones a P–N junction is formed, into whose space charge region 3 radioactive palladium 107 is added. These palladium particles cause more electrons to be raised from the valence band to the conduction band than is the case on the basis of thermal equilibrium. This entails an increased charge-carrier formation including electrons and holes which migrate to different sides of the barrier layer according to their polarity. Thus, a potential is formed at the P–N junction which is superimposed on the diffusion potential usually prevailing at the P–N junction. The transformation of the radiation energy into electrical energy achieved thereby may be utilized for practical purposes, since the voltage at the P–N junction derived from the radiation energy supples current in a circuit connected with the thus-constituted semiconductor battery.

As far as possible, the beta radiators used should not have a maximum electron energy higher than 100,000 ev., since otherwise the semiconductor crystal may be too strongly affected or even destroyed.

Preferably, the radioactive substances are introduced during the crystal growing. There should be approximately 1 radioactive particle per $10^7$ to $10^9$ atoms of semiconductor material. If, for example, a P-type crystal mixed with nickel 63 is grown using a silicon semiconductor body, a barrier layer can be produced by diffusing in phosphorus or another N-type material.

The same production process is, of course, also suitable for use with palladium or other radioactive substances. Likewise, of course, an N-type silicon crystal may be grown, into which boron or gallium, for example, is diffused. It should be further pointed out that the present teaching also applies to other semiconductor materials besides silicon.

For achieving a high efficiency, the beta radiation should bombard and ionize as large a number of atoms as possible. If charge carriers, which are liberated from atoms by the radiation, are to reach the barrier layer and therefore to contribute somewhat to the desired voltage, it is important that the semiconductor material be one having a long lifetime.

It is preferable to use a semiconductor body with a high lifetime. In such a semiconductor body having a high lifetime recombination between electrons and holes occurs very seldom.

It will be understood that the above description of the present invention is susceptible to various modifications, changes and adaptations, and the same are intended to be comprehended within the meaning and range of equivalents of the appended claims.

We claim:

1. A semiconductor device for generating electric energy, comprising a semiconductor body having at least two oppositely-doped semiconductor zones forming between themselves a P–N junction, and at least one of said zones having a radioactive substance added therein.

2. A semiconductor device according to claim 1, wherein the radioactive substance is located in the region of the P–N junction.

3. A semiconductor device according to claim 1, wherein said radioactive substance is one which emits beta radiation.

4. A semiconductor device according to claim 3, wherein said radioactive substance comprises nickel 63.

5. A semiconductor device according to claim 3, wherein said radioactive substance comprises palladium 107.

6. A semiconductor device according the claim 1, wherein said radioactive substance comprises a beta radiator with a maximum electron energy not exceeding 100,000 electron volts.

7. A semiconductor device according to claim 1, wherein the semiconductor body is one in which the carrier has a high lifetime.

8. A semiconductor device according to claim 1, wherein said radioactive substance is located to produce charge carriers at a point spaced from said P–N junction a distance which is equal maximally to the length of one diffusion path.

References Cited by the Examiner

UNITED STATES PATENTS

| | | | |
|---|---|---|---|
| 2,745,973 | 5/1956 | Rappaport | 310—3 |
| 2,789,240 | 4/1957 | Cohen | 310—3 |
| 2,847,585 | 8/1958 | Christian | 310—3 |
| 2,876,368 | 3/1959 | Thomas | 310—3 |
| 3,037,067 | 5/1962 | Bartolomei | 310—3 X |

OTHER REFERENCES

Pfann, W. G., and W. van Roosbroeck: "Radioactive and Photoelectric P–N Junction Power Sources"; Journal of Applied Physics, vol. 25, No. 11, November 1954; pages 1422–1434; pages 1423, 1427 and 1431 relied upon.

Linder, E. G., et al.: "The Direct Conversion of Radiation Into Electrical Energy"; Peaceful Uses of Atomic Energy, Geneva Conf.; vol. 15; United Nations Publication; 1956 (TK 9006 I5), pp. 283–290; pp. 288 and 290 relied upon.

Rappaport et al: "The Electron-Voltaic Effect in Germanium and Silicon P–N Junctions"; RCA Review; March 1956; vol. 17; pages 100–128 (TK 6540 R122); pp. 102, 109, 114, 118, 121, and 122 relied upon.

CHESTER L. JUSTUS, *Primary Examiner.*

C. F. ROBERTS, *Assistant Examiner.*